United States Patent
Kye

(10) Patent No.: US 7,322,590 B2
(45) Date of Patent: Jan. 29, 2008

(54) FUEL TANK AND SUSPENSION STRUCTURE

(75) Inventor: Gyoung-Tae Kye, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 383 days.

(21) Appl. No.: 11/035,980

(22) Filed: Jan. 18, 2005

(65) Prior Publication Data

US 2006/0017253 A1    Jan. 26, 2006

(30) Foreign Application Priority Data

Jul. 20, 2004   (KR) ................. 10-2004-0056385

(51) Int. Cl.
| B60G 21/05 | (2006.01) |
| B60G 21/055 | (2006.01) |
| B62D 21/11 | (2006.01) |
| B60P 3/22 | (2006.01) |

(52) U.S. Cl. ............... 280/124.106; 280/124.109; 280/124.166; 280/834; 267/188

(58) Field of Classification Search ......... 280/124.106, 280/124.166, 124.109, 834; 301/127; 267/188
See application file for complete search history.

(56) References Cited

U.S. PATENT DOCUMENTS

| 1,833,401 | A | * | 11/1931 | Moorhouse ......... 280/124.175 |
| 2,219,140 | A | * | 10/1940 | Olsen .................... 267/189 |
| 2,685,479 | A | * | 8/1954 | Buckendale ............. 301/124.1 |
| 3,342,507 | A | * | 9/1967 | Koch et al. ............. 280/86.754 |
| 4,951,962 | A | * | 8/1990 | Tomida et al. ......... 280/124.108 |
| 5,002,325 | A | * | 3/1991 | Fought et al. ............ 296/37.14 |
| 5,118,070 | A | * | 6/1992 | Reid ........................ 248/635 |
| 5,201,547 | A | * | 4/1993 | Ogawa et al. ............... 280/834 |
| 5,507,518 | A | * | 4/1996 | Nakahara et al. ...... 280/124.166 |
| 6,487,886 | B2 | * | 12/2002 | Ueno et al. .................... 72/57 |
| 7,063,355 | B2 | * | 6/2006 | Hashimura ................ 280/830 |
| 2004/0256828 | A1 | * | 12/2004 | Han et al. ............. 280/124.106 |
| 2006/0158023 | A1 | * | 7/2006 | Gottschalk et al. ......... 301/127 |

FOREIGN PATENT DOCUMENTS

| JP | 06-92121 | 4/1994 |
| KR | 20-1997-22986 | 6/1997 |
| KR | 10-1998-76823 | 11/1998 |
| KR | 10-2004-173 | 1/2004 |

OTHER PUBLICATIONS

English Language Abstract of KOREAN10-1998-76823.
English Language Abstract of KOREAN20-1997-22986.
English Language Abstract of KOREAN10-2004-173.
English Language Abstract of JP 06-92121.

* cited by examiner

Primary Examiner—Paul N. Dickson
Assistant Examiner—Joselynn Y. Sliteris
(74) Attorney, Agent, or Firm—Greenblum & Bernstein, P.L.C.

(57) ABSTRACT

The lower side of a fuel tank positioned above a torsion beam is downwardly convexly formed, and the torsion beam is also downwardly convexly bent in correspondence to the lower side of the fuel tank, thereby providing a sufficient capacity of the fuel tank and space for allowing the torsion beam to smoothly operate therein.

6 Claims, 2 Drawing Sheets

FUEL TANK AND SUSPENSION STRUCTURE

CROSS-REFERENCE TO RELATED APPLICATIONS

The present application is based on, and claims priority from, Korean Application Serial Number 10-2004-0056385, filed on Jul. 20, 2004, the disclosure of which is hereby incorporated by reference herein in its entirety.

FIELD OF THE INVENTION

The present invention relates generally to a vehicle fuel tank and suspension structure disposed adjacent to the fuel tank. More particularly, the present invention relates to structures of a torsion beam and fuel tank in a vehicle having a torsion beam axle type suspension.

BACKGROUND OF THE INVENTION

A torsion beam axle type suspension has a torsion beam that connects both trailing arms. When the vehicle is in motion, the torsion beam vertically shifts or pivots in relation to the vehicle body to support the vehicle body.

If the vehicle body bounces when the vehicle is in motion, the torsion beam vertically shifts in relation to the vehicle body, and the torsion beam pivots in relation to the vehicle body during a vehicle rolling.

Thus, a sufficient space is required to permit the action of the torsion beam between the torsion beam and lower side of the vehicle body.

The torsion beam axle type suspension is generally employed in rear suspension systems. The rear lower side of the vehicle body is typically equipped with a fuel tank. Therefore, whether the torsion beam and fuel tank interfere with each other should be taken into consideration when designing the vehicle.

SUMMARY OF THE INVENTION

According to a preferred embodiment of the present invention, a structure is provided, when a fuel tank is located above a torsion beam, to form a lower side of the fuel tank to correspond to the movement of the torsion beam and to form the torsion beam to correspond to the lower side structure of the fuel tank. This structure forms a sufficient capacity of the fuel tank and, simultaneously, an operation space to allow the torsion beam to smoothly move therein.

In one aspect, the invention provides a fuel tank and suspension structure, including a torsion beam convexly and downwardly bent at a middle portion thereof. A fuel tank is distantly located above the torsion beam and convexly protrudes at the lower side thereof toward the middle portion of the torsion beam.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
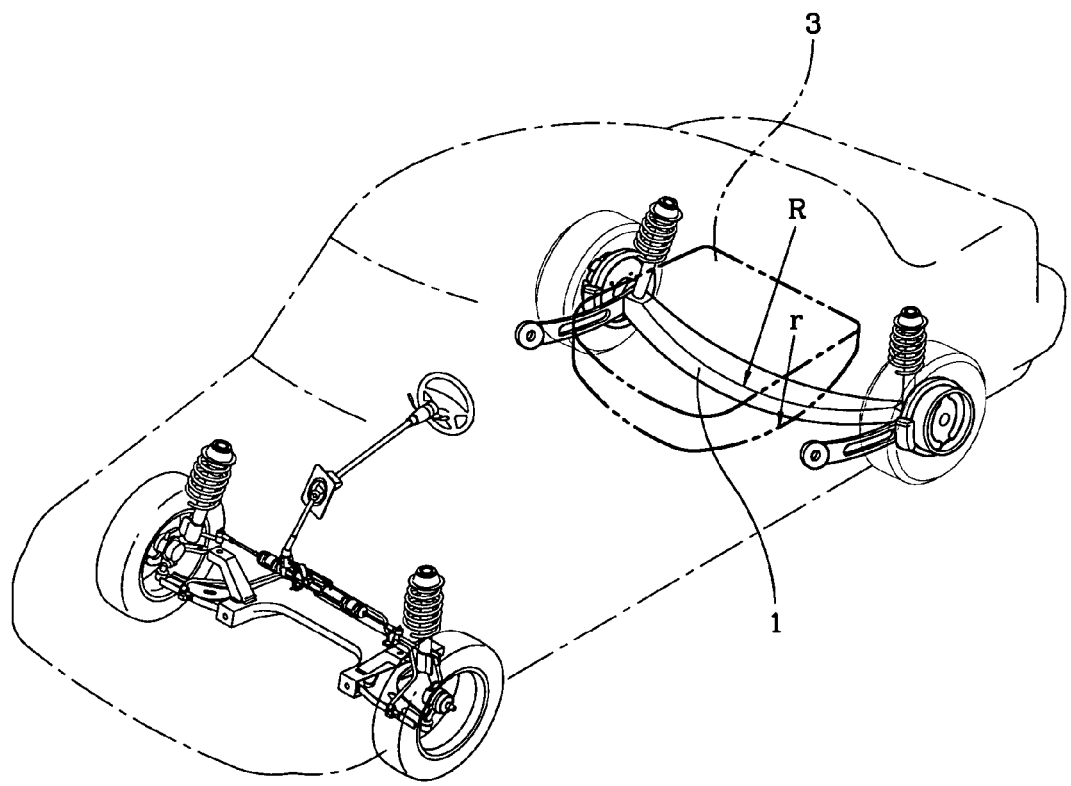
FIG. 1 is a view to show a vehicle fuel tank and suspension structure according to an embodiment of the present invention.
Figure 2:
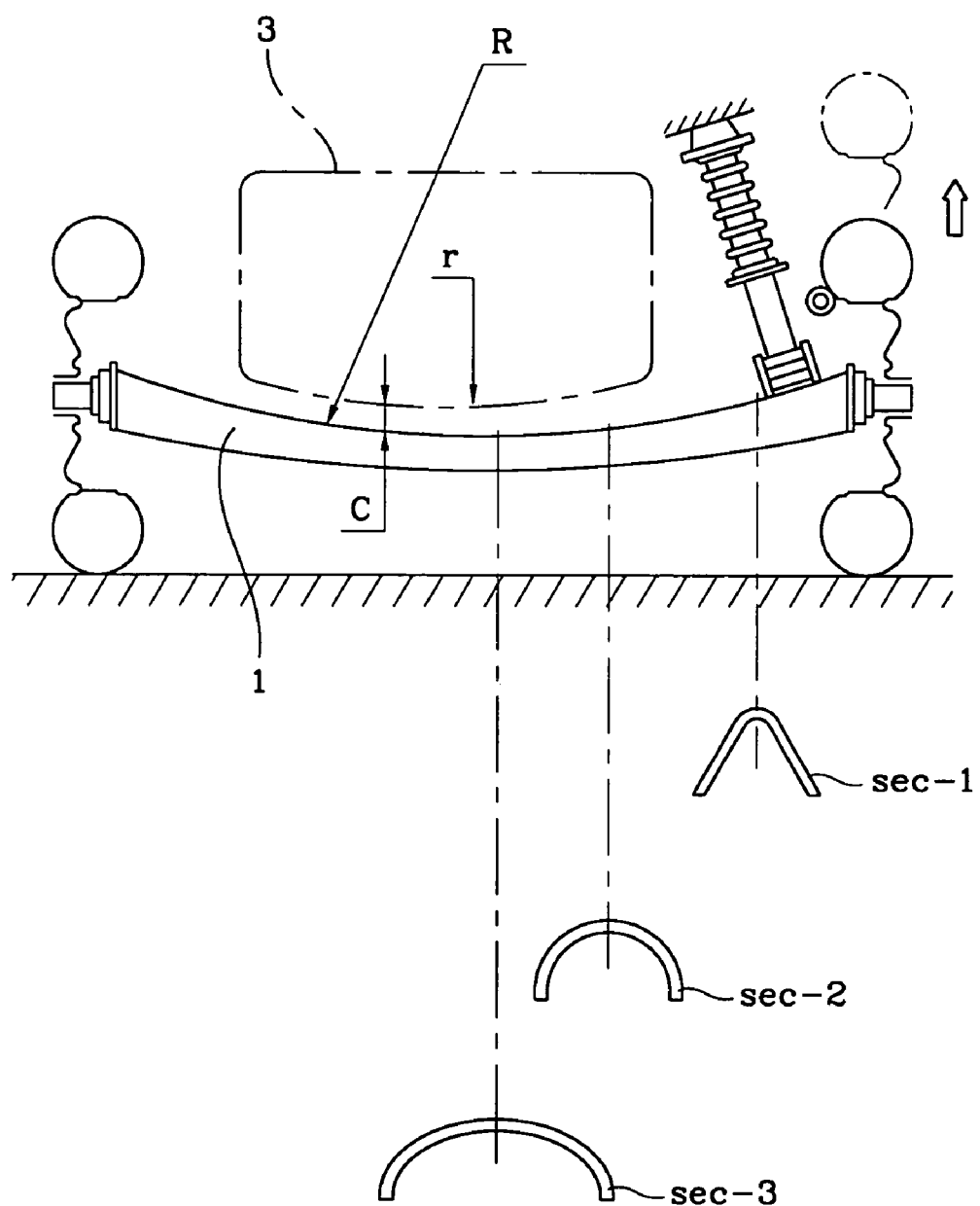
FIG. 2 is a view to show a detailed structure of the vehicle fuel tank and suspension portion of the embodiment of FIG. 1.

Referring to FIGS. 1 and 2, an embodiment of the present invention includes a torsion beam 1 convexly and downwardly bent at a middle portion thereof. A fuel tank 3 is distantly located above the torsion beam 1 and convexly protrudes at the lower side thereof toward the middle portion of the torsion beam 1.

The fuel tank 3 is installed at a lower side of the vehicle and convexly and downwardly formed at the lower side thereof. This formation allows the fuel tank 3 to have a sufficient capacity. The torsion beam 1 is depressed downwardly at the middle portion thereof to correspond to the formation of the fuel tank 3, thereby preventing an interruption with the fuel tank 3.

The torsion beam 1 is convexly and downwardly formed with a constant radius of having a curvature R of the torsion beam while the lower side of the fuel tank 3 is convexly and downwardly formed with a radius having a curvature r of the lower side of the fuel tank, wherein the radius r is smaller than the radius R. An interval C is almost constantly formed between the fuel tank 3 and torsion beam 1 in a vertical direction along the longitudinal direction of the torsion beam 1.

The cross sections of the torsion beam 1 at both ends are formed in an inverted V-shaped cross section, and the cross section of the middle portion of the torsion beam 1 is formed in an inverted U-shaped cross section. The width of the middle portion of the torsion beam 1 is wider than the widths of both ends of the torsion beam 1.

The cross sections of the torsion beam 1 is formed in an inverted V-shaped cross section at both ends thereof and gradually turn into an inverted U-shaped cross section toward the middle portion as illustrated in FIG. 2. The torsion beam 1 has the widest width at the middle portion thereof (see sec-1, sec-2, and sec-3).

Both ends of the torsion beam I are formed in an inverted V-shaped cross section, and the middle portion of the torsion beam 1 is formed in an inverted U-shaped cross section. The width of the middle portion of the torsion beam 1 is wider than the widths of both ends of the torsion beam 1 in the anteroposterior direction of the vehicle.

The torsion beam 1 is formed in an inverted V-shaped cross section at both ends thereof and gradually turns into an inverted U-shaped cross section toward the middle portion as illustrated in FIG. 2. The torsion beam 1 has the widest width at the middle portion thereof (see sec-1, sec-2, and sec-3).

The declination of a shear center as the middle of the torsion beam 1 is downwardly bent is precluded by forming the middle portion of the torsion beam 1 into an inverted U-shaped cross-section.

The operation of the embodiment of the present invention thus constructed will now be described.

As the torsion beam 1 is downwardly curved at the middle portion thereof, the lower side of the fuel tank 3 can be downwardly convexly formed, thereby increasing the capacity of the fuel tank 3 up to a desired level.

The interval C is almost constantly formed between the lower side of the fuel tank 3 and the upper side of the torsion beam 1 in a vertical direction. While a vehicle pitches across a terrain, the torsion beam 1 moves smoothly and vertically within the space between the torsion beam 1 and fuel tank 3 without interruption with each other and serves to support the vehicle body.

In the event of a vehicle rolling, the torsion beam 1 pivots and one end thereof is raised in relation to the vehicle body while the other end is lowered. However, even if the one end of the torsion beam 1 is raised, because one end of the fuel tank 3 located above the torsion beam 1 is also in an upwardly sloped configuration, interruption with the torsion beam 1 is effectively prevented.

In short, the torsion beam 1 during the vehicle rolling can provide an adequate rolling angle of the vehicle body.

As apparent from the foregoing, there is a notable advantage in that the lower side of the fuel tank positioned above the torsion beam is downwardly convexly formed, and the torsion beam is also downwardly convexly bent in correspondence to the lower side of the fuel tank, thus acquiring a sufficient capacity of the fuel tank and space in which the torsion beam can smoothly operate.

What is claimed is:

1. A fuel tank and suspension structure, comprising:
   a torsion beam having a convexly and downwardly bent shape; and
   a fuel tank located spaced above said torsion beam and having a convexly protruding lower side that extends towards a middle portion of said torsion beams,
   wherein said torsion beam is connected to wheels at opposite ends thereof.

2. The structure as defined in claim 1,
   wherein cross sections of said torsion beam at opposite ends are formed in an inverted V-shape and a cross section of said torsion beam at the middle portion thereof is in an inverted U-shape, and a width of the middle portion of said torsion beam is wider than widths of opposite ends of said torsion beam.

3. The structure as defined in claim 1, wherein said torsion beam is convexly and downwardly formed with a radius of curvature R of said torsion beam while the lower side of said fuel tank is convexly and downwardly formed along a radius of curvature r, the radius r being smaller than the radius R.

4. The structure as defined in claim 1, wherein said wheels are directly connected to the opposite ends of said torsion beam.

5. A fuel tank and suspension structure, comprising:
   a torsion beam having a convexly and downwardly bent shape; and
   a fuel tank located spaced above said torsion beam and having a convexly protruding lower side that extends towards a middle portion of said torsion beam;
   wherein cross sections of said torsion beam at opposite ends are formed in an inverted V-shape and a cross section of said torsion beam at the middle portion thereof is in an inverted U-shape, and a width of the middle portion of said torsion beam is wider than widths of opposite ends of said torsion beam.

6. The structure as defined in claim 5, wherein said torsion beam is convexly and downwardly formed with a radius of curvature R of said torsion beam while the lower side of said fuel tank is convexly and downwardly formed along a radius of curvature r, the radius r being smaller than the radius R.

* * * * *

UNITED STATES PATENT AND TRADEMARK OFFICE
CERTIFICATE OF CORRECTION

PATENT NO.       : 7,322,590 B2  Page 1 of 1
APPLICATION NO.  : 11/035980
DATED            : January 29, 2008
INVENTOR(S)      : G. Kye It is certified that error appears in the above-identified patent and that said Letters Patent is hereby corrected as shown below:

At column 3, line 23 of the printed patent, "beams" should be -- beam --.

Signed and Sealed this

Fifth Day of August, 2008

JON W. DUDAS
*Director of the United States Patent and Trademark Office*